R. E. HELLMUND.
CONTROL SYSTEM.
APPLICATION FILED JULY 12, 1915.

1,306,539.

Patented June 10, 1919.

WITNESSES:
R. J. Eidge.
W. R. Coles

INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,306,539.  Specification of Letters Patent.  Patented June 10, 1919.

Application filed July 12, 1915. Serial No. 39,376.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Control Systems, of which the following is a specification.

My invention relates to systems of control, and it has special reference to the control of electric railway motors that are adapted for "field control" or regenerative operation.

The object of my invention is to provide a distributing system in connection with a control system of the above-indicated character, whereby relatively efficient conjoint operation may be obtained.

Heretofore, in most systems of the type under consideration, special means, in the form of a battery or motor-generator set or the like, have been provided for at times increasing the series field-winding current above the value of the simultaneous armature current and, at other times, when the field current has decreased below the armature current, the surplus current not needed by the field winding has usually been wasted through resistance.

According to my present invention, the main dynamo-electric machine or propelling motor that is employed, is preferably designed so that approximately the maximum desired field excitation to give proper operation under any conditions of "field control" or regeneration is obtained when the full armature current traverses the field winding, and regulation is partially obtained by shunting the surplus field current at various other times through useful energy-consuming devices and partially by external excitation, as hereinafter more fully set forth.

My invention is particularly adapted for use in relatively high-voltage systems, wherein it is difficult and expensive to obtain a suitably low voltage for translating devices, as will be understood.

Figure 1:
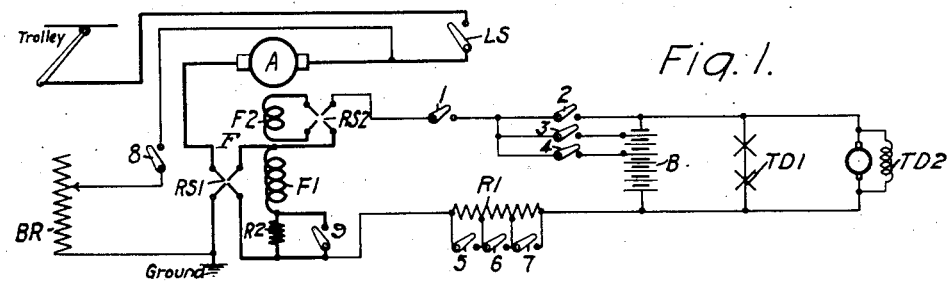

In the accompanying drawings, Figure 1 is a diagrammatic view of a system of control embodying my invention, and Figs. 2 to 5, inclusive, are similar diagrammatic views of modifications of my invention.

Referring to Fig. 1 of the drawing, the system here shown comprises a plurality of suitable supply-circuit conductors respectively marked "Trolley" and "Ground", a dynamo-electric machine provided with an armature A and a field winding F having a portion F1 that is connected in series-circuit relation with the armature A through a reversing switch RS1 of any suitable type and having a portion F2 that is connected through a similar reversing switch RS2 intermediate the field winding F1 and a distributing system to be described; a resistor R2 that is connected in series circuit with the field winding F1 and is adapted to be short-circuited by a switch 9; a resistor BR that is adapted to be connected, through a switch 8, across the main dynamo-electric machine, under conditions of dynamic braking; and a distributing system that is adapted to be connected across the field winding F and may comprise a plurality of useful energy-consuming devices, such as a battery B, a plurality of lamps or heating devices TD1, and a small shunt-connected motor TD2 that may be employed in any suitable manner. A resistor R1 is connected in circuit intermediate the field-winding portion F1 and the battery B and may be regulated in value by means of a plurality of suitable switches 5, 6 and 7. The distributing system may be connected to the field winding F or disconnected therefrom by means of a suitable switch 1, and the portion of the battery B that is connected in circuit with the field winding F may be varied, as desired, through the agency of a plurality of switches 2, 3 and 4.

The particular system of acceleration for the main motor, except in so far as the utilization of surplus field current is concerned, is immaterial to my present invention and no such system will be described here. Assuming, by way of illustration, that the motor is in operation and that it is desired to return energy to the supply circuit by reason of the momentum acquired by the driving vehicle, the motor is first disconnected from the supply circuit while the reversing switch RS1 is reversed, for a well-known purpose. The switch 1 may then be closed to connect the distributing system across the field winding F, and the switch 8 may be left open to render the braking resistor BR initially inoperative. By reason of the preferable design of the field winding F with respect to the armature A, as already mentioned, approximately the maximum desired excitation is obtained when the full armature current traverses the field winding F1: consequently, at other times when the necessary field current is below the current simultaneously traversing the armature, the surplus current is automatically distributed to the distributing system, whereby the battery B may be charged and the translating devices TD1 and TD2 may be suitably energized, as will be understood. For varying the voltage delivered to the distributing system from the field winding F, or vice versa, the switches 5, 6 and 7 may be suitably manipulated to vary the resistor R1, and, to vary the portion of the battery B that receives charging current, the switches 2, 3 or 4 may be closed.

When the regenerative speed of the main dynamo-electric machine has decreased to a relatively low value, so that regenerative operation is no longer possible, the switch 8 may be closed to connect the braking resistor BR across the entire main machine, and the value of the resistor BR in circuit may be varied in any suitable manner to dynamically brake the vehicle and bring it practically to a dead stop, the distributing system meanwhile receiving or delivering current as before.

The provision of the field winding portion F2 gives the motor a compound characteristic during both acceleration and regeneration. When the motor is being accelerated, the reversing switch RS2 occupies a position to cause the field-winding F2 to assist the field winding F1. Consequently, upon an increase of armature current, for instance, the effective field strength is increased by both windings F1 and F2 to provide a desirably heavy field flux in accordance with the simultaneous motor load. On the other hand, during regenerative operation, the field winding portion F2 is reversed to act differentially with respect to the field winding portion F1. Therefore, upon an increase of armature current, for example, the winding F1 is strengthened by the armature current directly, while the winding F2 is strengthened in accordance with the increase in the current delivered to the distributing system, with the result that the effective machine voltage is reduced and the regenerated voltage and current are maintained substantially constant. This result follows from the fact that the distributing circuits include the battery B, the counter-electromotive force of which, during the above-mentioned change in armature current, is constant. The current through the battery branch will increase disproportionately to the increase in the voltage drop across the field winding F, since the resistance of the circuit including the battery is low. Consequently, the differential winding F2 will increase in strength faster than the entire field winding F, thus providing the desired negative compound characteristic. The resistor R2 may also be employed to prevent surges of current, if desired.

It should be observed that the employment of the resistor R1, during motoring, as well as the presence of the field winding F2, tend to impart a positive compound characteristic to the main machine for the following reasons: When the current traversing the armature increases, an augumented current will flow through the resistor R1, thus increasing the voltage drop across the resistor and also the voltage across the winding F, the latter voltage being the sum of the substantially constant battery voltage and the increased voltage of the resistor. Consequently, the current in winding F1 and also the current in winding F2, which is the same as that in the resistor R1, increase. Since both windings magnetize in the same direction, the total field strength increases with the load current, thus giving a positive compound characteristic; and, on the other hand, when the current in the armature decreases, the current in both field windings and, therefore, the total field strength decreases.

It will be noted that, by reason of the connection of the battery B to the field winding F, the reversal or interruption of current in the field winding is prevented in case the supply circuit voltage fails at any time, thereby completely obviating the possibility of "flash-over" trouble, which would occur in case the regenerative current in the field winding F were to reverse, as will be understood. Moreover, in case of deënergization of the field winding F, for any reason, the battery B immediately assumes the load imposed by the distributing system and supplies the necessary current to the translating devices TD1 and TD2.

Figure 2:
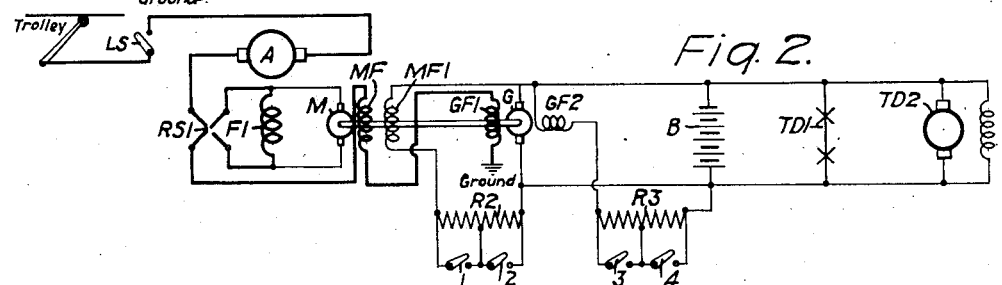

Referring now to Fig. 2, the system shown comprises the supply-circuit conductors Trolley and Ground; the main dynamo-electric machine having the armature A and the field winding F1; the reversing switch RS1; the distributing system, as illustrated in connection with Fig. 1; and, in addition, an auxiliary motor-generator set or dynamotor, one armature M of which is connected directly across the field winding F1 of the main machine. The motor-generator set comprises the armature M, an exciting field winding MF therefor that is connected in series-circuit relation with the main dynamo-electric machine; a second field winding MF1 for the armature M that is connected through a suitable variable resistor R2 across a second armature G that is mechanically connected to the armature M in any suitable manner; a field winding GF1 that is connected in series-circuit relation with the main dynamo-electric machine; and a field winding GF2 that is connected across the armature G through a suitable variable resistor R3. The distributing system, comprising the battery B and other translating devices, is directly connected to the armature G of the motor-generator set.

The operation of the system just described is similar to that set forth in connection with Fig. 1, the armature M of the motor-generator set receiving any surplus current from the field winding F1 of the main machine and mechanically transmitting the resulting energy to the armature G, whereby the distributing system may be supplied with energy. In addition, the provision of the series-connected field winding MF inherently permits of a regulating effect which tends to maintain a relatively constant voltage upon the distributing system. This result is accomplished as follows: In case the regenerative current traversing the main armature A increases, the current traversing both the main field winding F1 and the auxiliary field winding MF is also increased to a predetermined degree and, consequently, the increase in speed of the motor-generator set, which would ordinarily result from the increase of voltage impressed upon the terminals of the armature M, is substantially nullified by reason of the increased flux produced by the field winding MF, whereby the speed and delivered voltage of the motor-generator set is maintained at a substantially constant value.

It will be noted that, in case of failure of the supply-circuit voltage, or if, for any other reason, the field winding F1 becomes deënergized, the battery B will supply energy to the motor-generator set, which will operate in a reversed manner, that is, the armature G will operate as a motor and the armature M will act as a generator to prevent reversal of the current traversing the field winding F1, and the battery will also supply the necessary energy to the various translating devices that are included in the distributing system.

Figure 3:
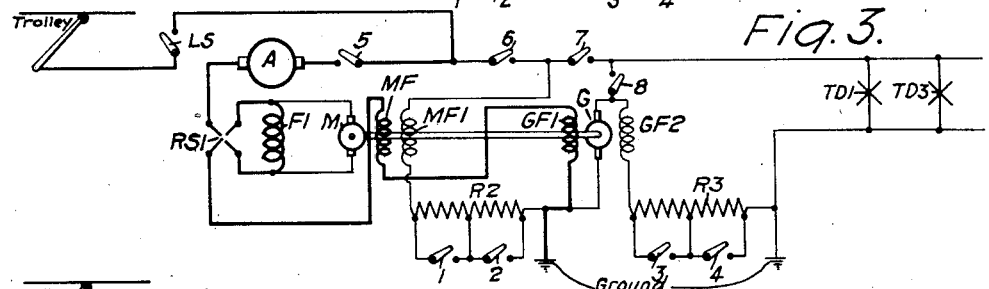

Referring now to Fig. 3, the system shown comprises the main dynamo-electric machine; the motor-generator set that is illustrated in Fig. 2; and a distributing system comprising a plurality of useful energy-consuming devices TD1 and TD3, for example. In this case, the armature M of the motor-generator set is again directly connected across the field winding F1, while, by closure of switches 6 and 7, the armature G is connected to the supply-circuit conductors Trolley and Ground. The exciting field windings MF1 and GF2 and the distributing system maintain the same relations with respect to the armature G that they did in connection with the system shown in Fig. 2.

The general operation of the system will be readily understood from the similarity of the systems previously described, and only a brief exposition thereof is deemed necessary. With switch 6 open and switch 7 closed, the armature G supplies energy to the translating devices only, while, with both switches closed, energy may also be returned to the supply circuit.

In the system just described, if it is desired to energize the distributing system when the main dynamo-electric machine is not to be operated, the switch 5 may be opened to disconnect the main machine from the supply circuit, whereby the motor-generator set will be reversed in operation, provided the switch 6 remains closed, and the distributing system will be supplied directly from the supply circuit.

Figure 4:
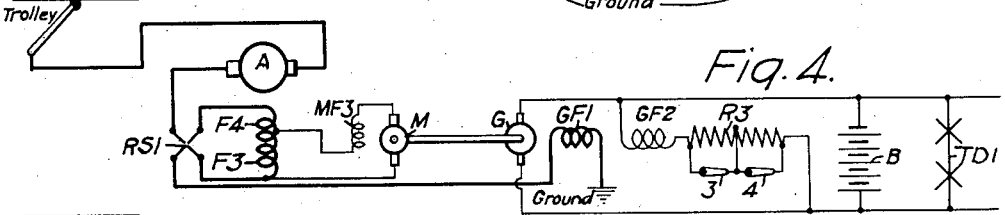
Figure 5:
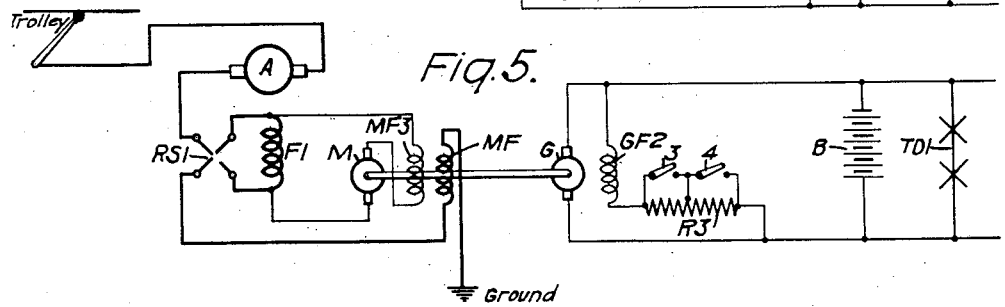

In Fig. 4 and Fig. 5 are shown systems that are adapted for use chiefly in connection with the acceleration of the motor. The system of Fig. 4 comprises the main motor, a distributing system, such as that illustrated in Fig. 1, and an auxiliary motor-generator set. One armature M of the set is connected in series-circuit relation with a field winding MF3 across a portion F3 of the main motor field winding, the other portion F4 thereof being connected directly intermediate the armature A and the portion F3. The generator armature G is shown as provided with the field winding GF1 that is connected in series-circuit with the main motor and with the shunt field winding GF2 that is differentially connected with respect to the winding GF1.

By reason of the purely series excitation of the armature M, the reversal of current therein during operation of the main motor is precluded, and reversed operation of the set from the battery B is prevented. The subdivision of the main motor field winding gives a compound or a series characteristic to the motor, and the provision of the generator series field winding also tends to impart a series characteristic to the motor. A system of the type just described tends to keep the motor relatively free from flash-over troubles by reason of the relatively high self-induction of the field winding MF3, whereby flux distortions resulting from current changes, especially upon the resumption of supply-circuit voltage after a temporary interruption thereof caused by a section insulator, for example, are prevented from becoming excessive.

In Fig. 5, the only differences from the system of Fig. 4 reside in the connections of the machine having the armature M, which is here shown as connected in series relation with the field winding MF3 across the entire field winding F1 of the main motor, and as also provided with the series-connected field winding MF. The advantages of this system are similar to those recited in connection with Fig. 4. The main motor will again be kept relatively free from flash-over troubles since the field winding MF, after a temporary interruption of supply-circuit voltage, tends to induce a considerable counter-flux in both the field winding MF3 and in the armature M, whereby a relatively strong flux is produced in the main field winding to prevent excessive distortions.

It will be understood that the general operation of the systems shown in Fig. 4 and Fig. 5, with respect to the distributing system, is substantially similar to that already set forth.

It will also be understood that the braking resistor BR may be employed in connection with the systems that are shown in Fig. 2 to Fig. 5, if desired, the operation thereof being identical with that set forth in the description of Fig. 1.

I do not wish to be restricted to the specific circuit connections or arrangement of parts herein set forth, inasmuch as various modifications thereof may be made within the spirit and scope of my invention. I desire, therefore, that only such limitations shall be employed as are indicated in the appended claims.

I claim as my invention:

1. In a system of control, the combination with a dynamo-electric machine having an armature and a field-magnet winding of the series type adapted to require an average current materially smaller than the average current traversing said armature, of a plurality of translating devices, and means for diverting all but a necessary exciting portion of the armature current from said field winding to said devices, for absorbing any surplus current or furnishing any necessary additional current and for regulating the amount of current supplied to said devices.

2. In a system of control, the combination with a dynamo-electric machine having an armature and a sub-divided field magnet winding, of a plurality of useful energy-consuming devices, means for diverting all but a necessary exciting portion of the armature current from said field winding to said devices, for absorbing any surplus current or furnishing any necessary additional current and for regulating the amount of current supplied to said devices, and means for reversing the parts of said field winding with respect to each other.

3. In a system of control, the combination with a dynamo-electric machine having an armature and a series field-magnet winding adapted to require an average current materially smaller than the average current traversing said armature, of a plurality of useful energy-consuming devices, a storage battery, and means for connecting said useful devices and said battery in mutual parallel relation to said field winding, whereby, under predetermined operating conditions, the battery and useful devices receive that portion of the armature current which is unnecessary for proper field excitation and whereby the battery may energize said useful devices upon deënergization of the dynamo-electric machine main circuit.

In testimony whereof I have hereunto subscribed my name this 29th day of June, 1915.

RUDOLF E. HELLMUND.

---

It is hereby certified that in Letters Patent No. 1,306,539, granted June 10, 1919, upon the application of Rudolf E. Hellmund, of Pittsburgh, Pennsylvania, for an improvement in "Control Systems," an error appears in the printed specification requiring correction as follows: Page 2, after line 69, insert the following paragraph:

*Furthermore, during regeneration, the resistor $R^1$ may be employed for adjusting the negative compound characteristic caused by the differentially-connected field winding $F^s$; that is, the tendency of the total effective field strength to decrease upon an incipient increase of armature current and vice versa. This action of the resistor follows from the fact that, upon an increase of regenerated current, the current traversing the field windings tends to increase, thus increasing the drop across the resistor $R^1$ in the battery circuit. Consequently, the total field voltage further tends to be raised to counteract to any desired degree the above-mentioned negative compound characteristic;* and that the said Letters Patent should be read with this correction therein that the same may conform to the record of the case in the Patent Office.

Signed and sealed this 15th day of July, A. D., 1919.

[SEAL.]

R. F. WHITEHEAD,
*Acting Commissioner of Patents.*

Cl. 172—179.